(12) United States Patent
Goh et al.

(10) Patent No.: US 9,424,098 B2
(45) Date of Patent: Aug. 23, 2016

(54) DYNAMIC RESOURCE SCHEDULING

(71) Applicant: Silicon Graphics International Corp., Fremont, CA (US)

(72) Inventors: Eng Lim Goh, Singapore (SG); Christian Tanasescu, Ottobrunn (DE); George L. Thomas, Sandy, UT (US); Charlton Port, Sandy, UT (US)

(73) Assignee: Silicon Graphics International Corp., Milpitas, CA (US)

( * ) Notice: Subject to any disclaimer, the term of this patent is extended or adjusted under 35 U.S.C. 154(b) by 232 days.

(21) Appl. No.: 13/931,819

(22) Filed: Jun. 29, 2013

(65) Prior Publication Data

US 2014/0068627 A1    Mar. 6, 2014

Related U.S. Application Data

(60) Provisional application No. 61/696,077, filed on Aug. 31, 2012.

(51) Int. Cl.

| | |
|---|---|
| *G06F 9/50* | (2006.01) |
| *G06F 11/30* | (2006.01) |
| *G06F 11/07* | (2006.01) |
| *G06F 9/48* | (2006.01) |
| *G06F 1/32* | (2006.01) |
| *G06N 5/00* | (2006.01) |
| *G06F 1/20* | (2006.01) |

(52) U.S. Cl.
CPC ............. *G06F 9/5094* (2013.01); *G06F 1/329* (2013.01); *G06F 1/3228* (2013.01); *G06F 9/4893* (2013.01); *G06F 9/5083* (2013.01); *G06F 11/0754* (2013.01); *G06F 11/3058* (2013.01); *G06F 1/206* (2013.01); *G06F 11/3006* (2013.01); *G06N 5/00* (2013.01); *Y02B 60/1275* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 7,644,148 | B2 * | 1/2010 | Ranganathan | G06F 1/206 709/223 |
| 8,224,993 | B1 * | 7/2012 | Brandwine | 709/244 |
| 2010/0083011 | A1 * | 4/2010 | Onouchi | G06F 1/10 713/300 |
| 2011/0231860 | A1 * | 9/2011 | Kazama et al. | 718/105 |

\* cited by examiner

*Primary Examiner* — Qing Wu
(74) *Attorney, Agent, or Firm* — Polsinelli LLP

(57) ABSTRACT

Embodiments of the invention relate to a system and method for dynamically scheduling resources using policies to self-optimize resource workloads in a data center. The object of the invention is to allocate resources in the data center dynamically corresponding to a set of policies that are configured by an administrator. Operational parametrics that correlate to the cost of ownership of the data center are monitored and compared to the set of policies configured by the administrator. When the operational parametrics approach or exceed levels that correspond to the set of policies, workloads in the data center are adjusted with the goal of minimizing the cost of ownership of the data center. Such parametrics include yet are not limited to those that relate to resiliency, power balancing, power consumption, power management, error rate, maintenance, and performance.

20 Claims, 5 Drawing Sheets

DYNAMIC RESOURCE SCHEDULING

CROSS REFERENCE TO RELATED APPLICATIONS

This application claims the priority benefit of provisional application Ser. No. 61/696,077, titled "DYNAMIC RESOURCE SCHEDULING", filed on Aug. 31, 2012, the disclosure of which is incorporated herein by reference.

BACKGROUND OF THE INVENTION

1. Field of the Invention

The present invention generally relates to a system and method for dynamically scheduling resources using policies to self-optimize resource workloads in a data center.

2. Description of the Related Art

Current hierarchy of physical memory, cache, main memory, and persistent storage do not lend themselves well to delivering on two key goals of an exascale system. Exascale systems are typically considered to be data centers with the capability to run $1 \times 10^{18}$ floating point operations per second (FLOPS) and beyond. Current main memory technologies do not offer the necessary capacity per watt required to support a revolutionary shift in computing technology required by exascale computing. If one considers the cache-to-main memory relationship in today's best case memory hierarchy scenario, it is only natural that this relationship will fall one step further in future system hierarchies. Cache memory simply cannot deliver capacities at scale without highly sacrificing power efficiency. Current main memory technologies cannot achieve significant super-capacity due to physical impediments in manufacturing technology.

Additionally, current memory technologies do not offer any implicit intelligence to assist in combating issues related to data locality. For example, today's cache and main memory operate in a symbiotic world of delivering data closer to the most advantageous compute device. However, in the case of the current globally shared memory models, the time to delivery of cache coherent non-uniform memory accesses can be measured in nanoseconds. These operations are often explicitly driven from within the communication library or from within the user application. Furthermore, the power required to move data from a physically distant location is currently orders of magnitude more than is theoretically feasible to support the requirement of a revolutionary computational platform, such as an exascale system.

These issues further exacerbate the lack of true system concurrency. Explicit parallelism has become the only method by which to achieve speedup at any scale. This methodology for achieving speedup does not currently hold true at scale, it will most certainly fail in the face of an increasingly complex host system. Application architects are forced to manage not only the concurrency and synchronizing of their algorithms, but also the concurrency and synchronization of all associated memory. To operate within a revolutionary computing platform, one must design concurrency and execution models that are implicitly parallel and explicitly sequential. This implies the initial design of implicitly parallel data structures, memory architectures, and execution models.

System resiliency and sustainability can be key to fully realizing a system's return on investment. Furthermore, it will be key to delivering a system of such revolutionary standards that will subsequently function during production execution. Simple application resiliency, or check-pointing, will not suffice as a basis for design. Memory hierarchies, interconnect paths, core processing, and potentially register-level resiliency must be accounted for in the initial design phases.

Thus enabling computing on the exascale requires the development of methods that increase resiliency, and manage power while increasing performance of the system.

SUMMARY OF THE INVENTION

Certain embodiments of the invention relate to a method for policy-based self-control and healing by adjusting workloads dynamically on a plurality of resources in the data center according to a set of policy rules. Thresholds or trends corresponding to target operational limits are used in some embodiments; they may be included in the set of policy rules. For example, a threshold may trigger the distribution or re-distribution of workloads in the data center dynamically when the threshold is approached or exceeded.

The method is performed in a data center and is scalable to run on exascale systems. Some embodiments of the data center have a plurality of processors and shared memory storing one or more programs for execution by the plurality of processors. One or more workload profiles are established to correspond with various software applications running in the data center. Workload profiles may be established in part by collecting historical tracking and analysis data for software applications running on hardware resources in the data center.

In these embodiments, one or more policy rules that correspond to one or more parametrics in the data center may be established by an administrator of the data center. The one or more policy rules may utilize historical tracking and analysis data for software applications running on hardware resources in the data center, or a combination thereof. Parametrics monitored by the method include, yet are not limited to, those that relate to resiliency, power consumption, power balancing, power management, maintenance, error rate, and performance.

The system and method dynamically adjusts resource allocation for the plurality of software applications based on the workload profiles and the monitored parametrics. A goal of the system and method is to keep the parametrics within limits, thresholds, or trends set by the policy rules. The parametrics typically correlate to the cost of ownership of the data center.

In certain embodiments of the invention, the parametrics are monitored and compared to the set of policy rules. When the operational parametrics approach or exceed levels that correspond to the set of policies, workloads in the data center are adjusted with the goal of minimizing the cost of ownership and maximizing the efficiency of the data center.

DETAILED DESCRIPTION

Figure 1:
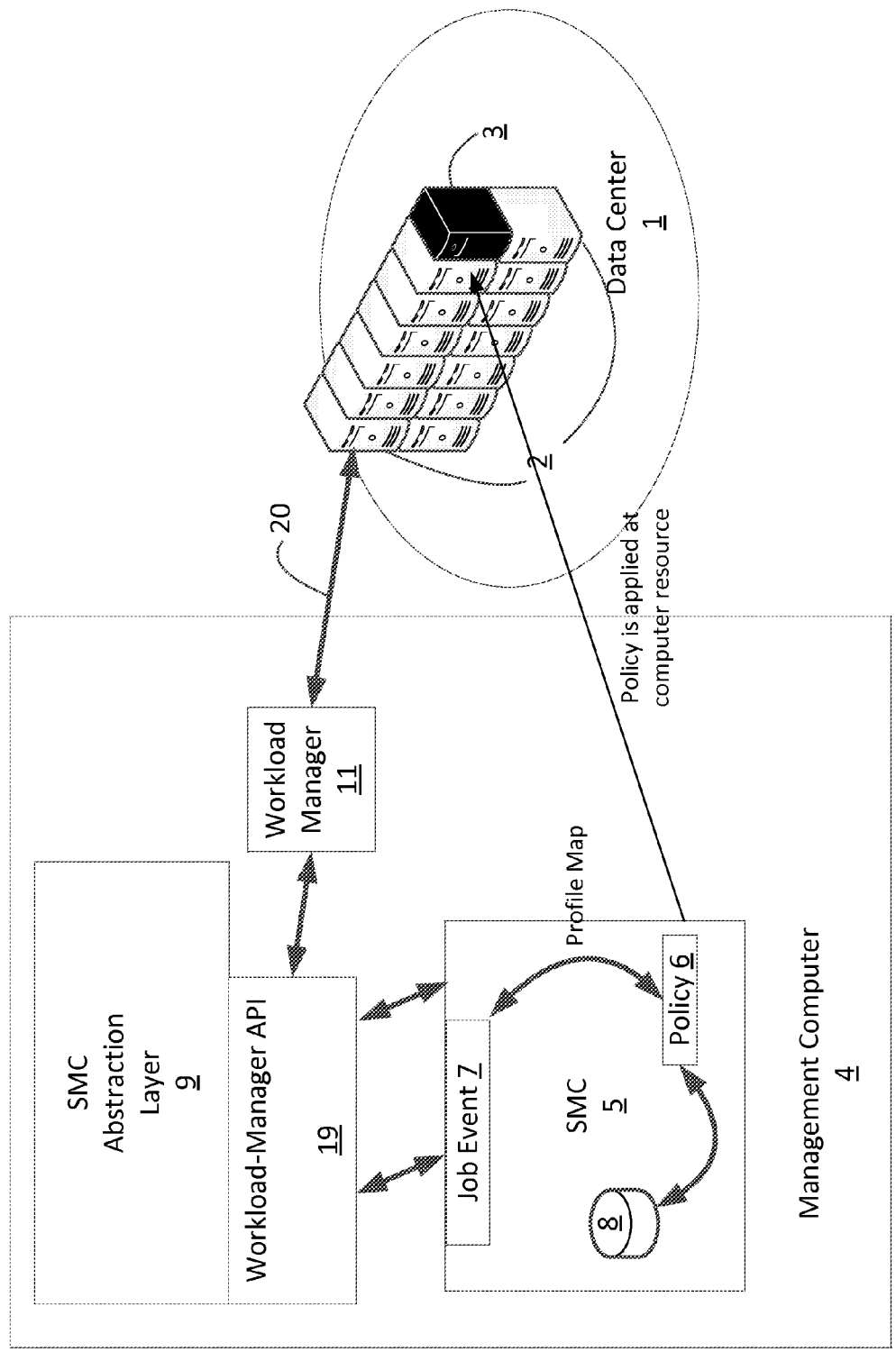
FIG. 1 illustrates a data center being monitored by a management computer.

Certain embodiments of the invention relate to policy-based self-control and healing. Workloads are adjusted dynamically on a plurality of resources in a data center according to a set of policy rules. Thresholds or trends corresponding to target operational limits are used in some embodiments and may be included in the set of policy rules. For example, crossing or approaching a threshold may trigger the distribution or re-distribution of workloads in the data center dynamically.

Embodiments of the invention allocate resources in the data center dynamically corresponding to a set of policies that are configured by an administrator. Operational parametrics that correlate to the cost of ownership of the data center are monitored and compared to the set of policies configured by an administrator. Workload modulation is part and parcel of the policy SLA. The policy primarily dictates energy modulation parameters for maintaining that SLA. Profile mapping creates the policy rules, and autonomous behaviours maintain the policy SLA. Energy modulation may be an element of the policy enforcement behaviour.

When the operational parametrics approach or exceed one or more levels that correspond to the set of policies, workloads in the data center are adjusted with the goal of minimizing the cost of ownership of the data center. Such parametrics include, yet are not limited to, those that relate to resiliency, power balancing, power consumption, power management, error rate, maintenance, and performance.

The method is performed in a data center and is scalable to run on exascale systems. Some embodiments of the data center have a plurality of processors and shared memory storing one or more programs for execution by the plurality of processors., one or more workload profiles are established corresponding to various software applications running in the data center. Workload profiles may be established in part by collecting historical tracking and analysis data for software applications running on hardware resources in the data center.

In these embodiments, one or more policy rules that correspond to one or more parametrics in the data center are setup by utilizing the historical tracking and analysis data for software applications running on hardware resources in the data center. The policy rules may be setup by an administrator of the data center. Parametrics which may be monitored include, yet are not limited to, resiliency, power consumption, power balancing, power management, maintenance, error rate, and performance.

The system dynamically adjusts resource allocation for the plurality of software applications based on the workload profiles and the monitoredparametrics. A goal of the system and method is to keep the parametrics within limits, thresholds, or trends established by the policy rules. The parametrics typically correlate to the cost of ownership of the data center.

In the context of exascale system requirements, as machines grow in scale and complexity, techniques to make the most effective use of network, memory, processor, and energy resources are becoming increasingly important. In some implementations, the exascale system overcomes these extreme scale issues through re-vamping software architectures and focusing on the future of high performance computing in this new era. This allows system management for exascale policy based self-control and workload scheduling. In some embodiments, the system derives information from analytical correlations from multiple data sources and application instances in which the solution manages resiliency, power consumption, power balancing, power management, maintenance, error rate, and performance.

In some embodiments, historic and parametric data may be used to collect facility-wide thermal and power information. The management software typically operates with open source and vendor batch schedulers to pull key metric data around FLOP and watt correlations to increase performance and efficiency through policies. These correlations are then utilized to correct, contain, or heal faulty hardware through the predictive failure analysis and policy based self-control algorithms. For example, a critical job needs to run on a certain amount of compute resources and within a certain monetary budget. A scheduler is flagged of the criticality and resource requirements for the data set. Management software allocates and analyzes the necessary resources available to submit the job, calculates the cost, and handles any anomalies in relation to predictive failures. The scheduler is then notified of the job start time and the compute resource pool. The job has an increased potential for success due to the multiple subsystems working together to ensure the maximum work from the system that is efficient, stable, and cost effective.

In certain other embodiments, the system first defines needed information and collects the information. This "Trend Monitoring" process consists of workload profiling one or more software applications to create a repository of "application instances" that are associated with performance data, and parametric data of a plurality of application instances. Trend monitoring profiles may include, yet are not limited to, measuring parametrics relating to FLOPS, Power Consumption, CPU time, memory latency, memory bandwidth, I/O latency, wait time, temperature, or error rate. Other trends that may be monitored or determined from the parametric data include disk statistics, historical tracking, power consumption for a given workload, data consumed for the duration of the workload, generating a baseline for the administrator when setting or modifying policy rules, or the like.

The invention addresses technical goals that are required to scale the data center to the exascale level. Challenges of developing exascale computing levels relate to power consumption, power utilization versus performance, access to data storage, and increased resiliency.

The system and method may also review and adjust resources allocations by correlating the resource requirements of different software applications in relation to enforced power policies. Benefits provided by the invention include yet are not limited to performance optimization, adherence to Service Level Agreement requirements, and minimizing the cost of ownership and operation of the data center.

FIG. 1 depicts an example of an embodiment of the invention. Data center 1 includes a plurality of compute nodes 2 and an erring compute node 3 managed by a management computer 4. The management computer 4 includes various software modules in communication with each other and with the data center 1. A system management tool 5, such as the SGI® Management Center (SMC) developed by Silicon Graphics International Corp. of Fremont, Calif., includes a policy engine 6, stored in the memory of manamgent computer 4, and a job event queue 7 in communication with an application profile analytics data base 8. The policy engine 6 may communicate regarding a profile map with job event 7. The policy may be applied at the computing resource at data center 1. The system management center 5 communicates with other software modules running on the management computer 4 which include a workload manager application program interface (API) 19, an SMC abstraction layer 9, and a workload manager 11. The SMC abstraction layer 9 abstracts the physical hardware resident in the data center 1 from the system management center 5. The invention may also include software management modules running on compute nodes in the data center that are in communication with the system management center not depicted in FIG. 1.

In response to the workload manager API 19 entering a new job into job queue 7, the policy engine 6 reviews the job type and the system management center 5 loads an optimal profile stored in the application profile analytics data base 8 into the policy engine 6. The system management center 5 monitors system parametrics that may include, yet are not limited to, temperature, error rate, failures, power consumption, and performance. Also depicted in FIG. 1 is the workload API manager 19 communicating with workload manager 11. The workload manager 11 then communicates with the data center using data communication interface 20. When a compute node 3 fails or errors significantly the workload manager 11 communicates with the workload API manager 19 which in turn communicates the failure to the system management center 5. At this point in time, the policy engine 6 selects what type of corrective action is required to overcome the erring compute node 3. Corrective actions that the policy engine 6 may invoke include, yet are not limited to, reducing the workload on the erring compute node 3, or initiating the migration of all jobs allocated to the failing compute node 3.

Certain embodiments of the invention may be implemented in numerous software modules like those depicted in FIG. 1. Other embodiments of the invention may be implemented in as few as one software module in communication with compute nodes in the data center. Thus, the software modules shown in FIG. 1 are exemplary of an embodiment of the invention. The invention is not limited the embodiment shown in FIG. 1, but rather may be implemented in one or more software modules.

In certain circumstances, reducing the workload on an erring compute node can cause the compute node to stop erring. An example of this is when memory, such as an array of DRAM is being accessed at speeds that approach the limit of the memories specified operating frequency. Reducing the workload on a compute node can give the DRAM memory running in the compute node additional timing margin. Furthermore, reducing the maximum operating frequency of DRAM accesses will tend to reduce the operating temperature of the DRAM, and cause the DRAM to use less power. Combined effects of increased timing margins and reduction of power dissipation in a DRAM can dramatically reduce the error rate of the DRAM.

Figure 2:
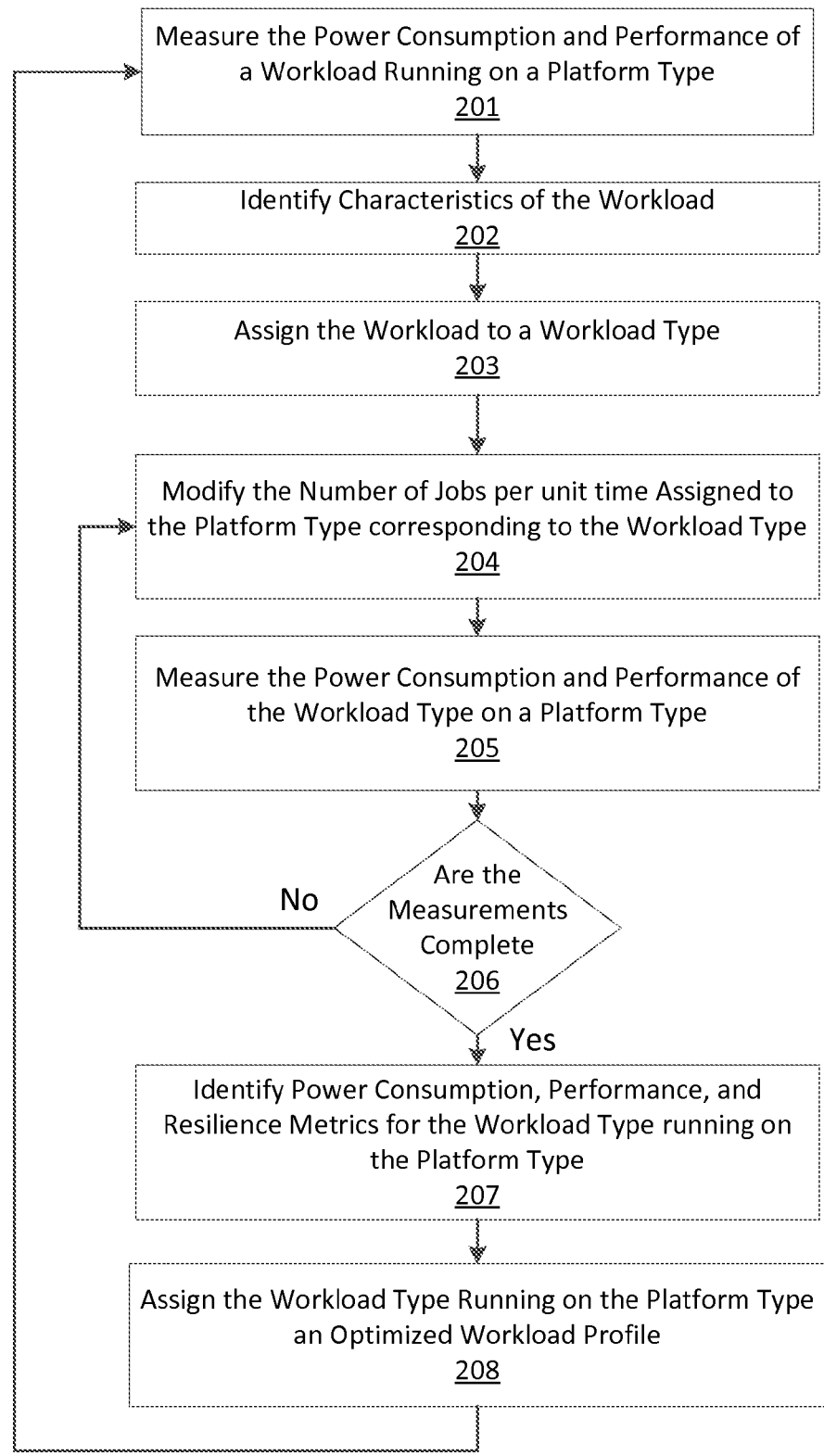
FIG. 2 illustrates a method for resource scheduling.

The steps identified in FIGS. 2-4 below (and the order thereof) are exemplary and may include various alternatives, equivalents, or derivations thereof including but not limited to the order of execution of the same. The steps of the methods of FIGS. 2-4 (and its various alternatives) may be embodied in hardware or software including a non-transitory computer-readable storage medium (e.g., an optical disc or memory card) having instructions executable by a processor of a computing device. A user may launch or activate the method of FIGS. 2-4 by opening or activating an application (e.g. system management tool 5) in a computing device such as management computer 4 or other computing device such as a mobile computing device. FIG. 2 illustrates a method for resource scheduling. The flow diagram begins by measuring the power consumption and performance of a workload running on a platform type in step 201. Next, characteristics of the workload are identified in step 202, and a workload type is assigned to the workload in step 203. For example, if the workload includes large serialized streams of data, the workload type could be a streaming workload type.

At step 204, the number of jobs running per unit time may be modified and assigned to a platform type that corresponds to the workload type. Power consumption and performance of the workload type on the platform type are measured in step 205. At step 206, a determination is made as to whether the power consumption and performance measurements for the data center are complete. If they are not complete, the flow diagram returns to step 204 where workloads for system resources are potentially modified again. If the measurements are complete, at least for the moment, the flow diagram proceeds to step 207. At step 207, power consumption, performance, and resilience metrics for the workload type running on the platform type are identified. In certain embodiments, workload profiles are updated on the fly, which is depicted in step 208. Step 208 assigns the workload type running on the platform type an optimized workload profile. The system is thus both proactive and reactive. When power consumption or error rate are high on certain resources, activity on those resources can be reduced or migrated to other resources in the data center.

Figure 3:
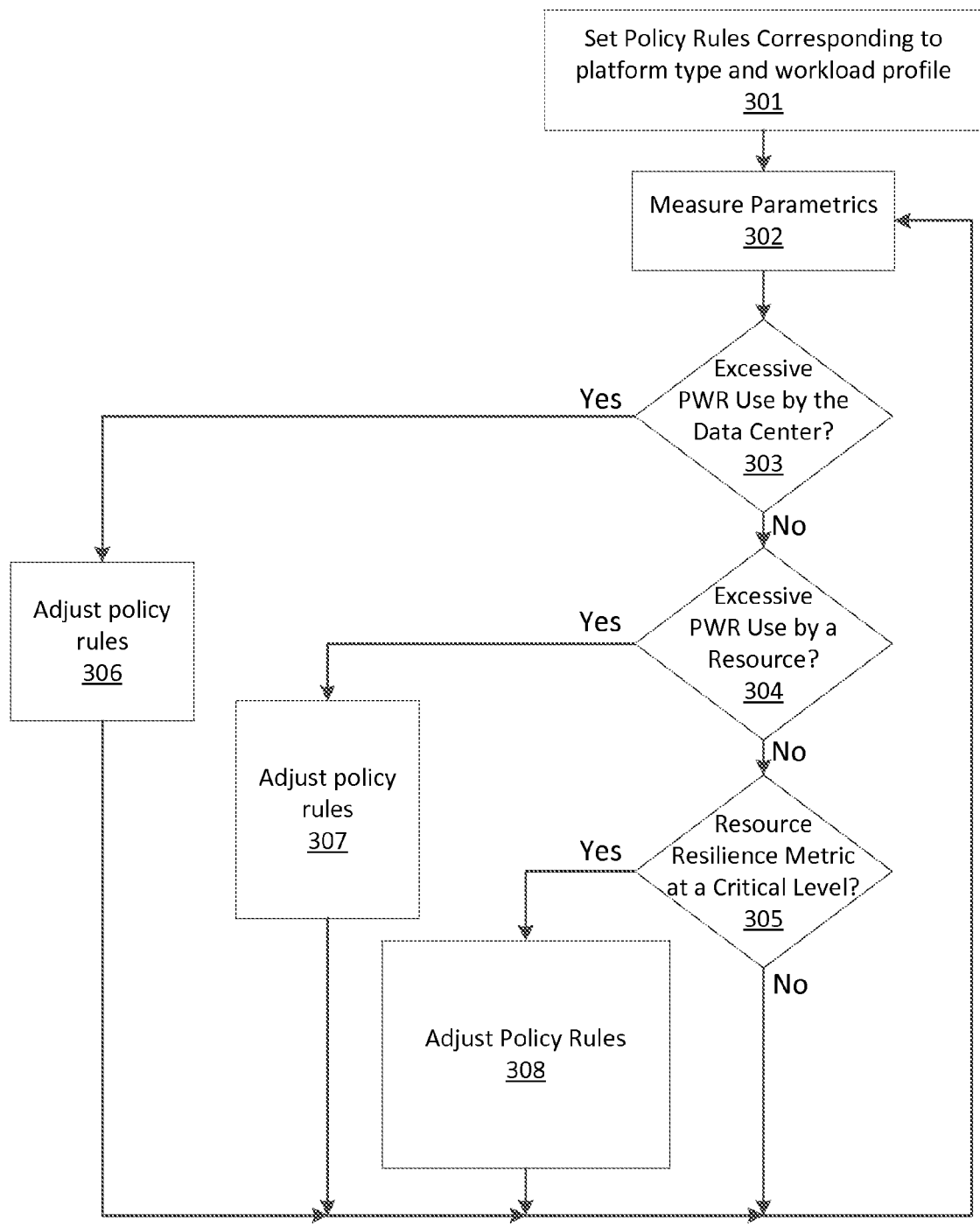
FIG. 3 illustrates a method for providing a program flow.

FIG. 3 is a flow diagram illustrating program flow in an embodiment of the invention. Policy rules corresponding to power thresholds and workload profiles are established at step 301. The policy rules are set corresponding to platform type and workload profile. As mentioned above, this may be based on historical data, configuration data set by an administrator, by a combination thereof, or be based on other metrics. Parametrics in the system are measured in step 302. Parametric data may be measured using hardware, software, or a combination thereof. For example, error rate may be measured by software observing how many errors are reported by a resource over time. Temperature sensed by a sensor in communication with an analog to digital converter that is sampled by software is an example of how a combination of hardware or software may measure temperature at a point inside the system.

Determining if excessive power is being consumed by the entire data center is evaluated at step 303 of the flow diagram. When excessive power is being drawn by the data center program flow proceeds to box 306 where the policy is adjusted. A workload distribution may adjusted to reduce the total power consumption of the data center. When the data center is not using excessive power program flow proceeds to step 304. Determining if excessive power is being used by a resource is evaluated at step 304. When excessive power is being used by a resource, program flow moves to box 307 where the policy is adjusted. The workload assigned to the resource using the excessive power may be reduced.

Determining if a resource resilience metric is at a critical level is evaluated at step 305. Then, a resource resilience metric is at a critical level program flow moves to step 308 where the policy is adjusted. The workload assigned the resource with the resilience metric at a critical level is reduced. When a resource resilience metric is not at a critical level program flow returns to step 302, where parametrics are measured. Outputs of steps 306, 307, and 308 also are depicted returning to step 302, measure parametrics.

Figure 4:
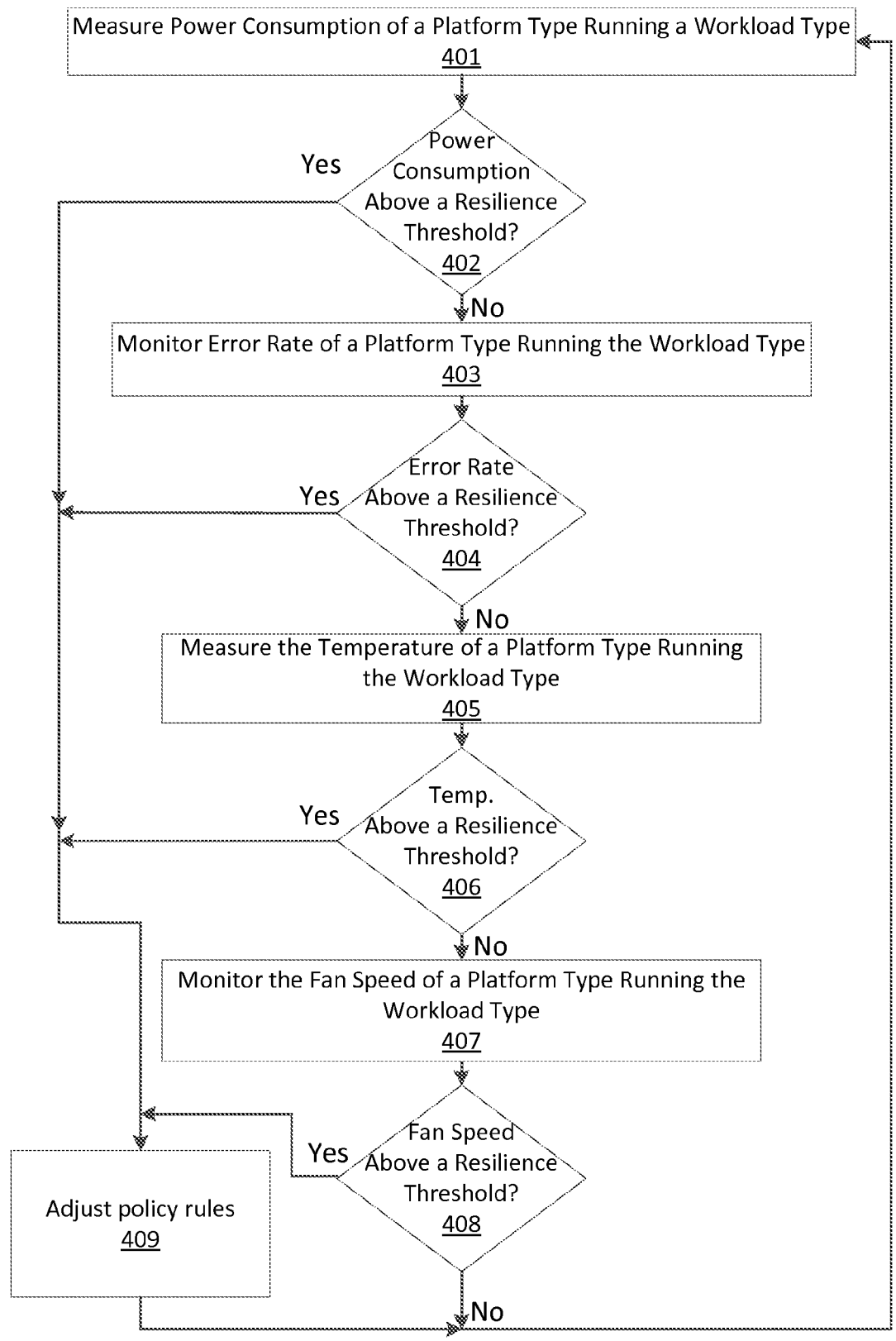
FIG. 4 illustrates a method for resiliency monitoring and corrective action.

FIG. 4 illustrates aresiliency monitoring and corrective actions consistent with an embodiment of the invention. Power consumption of a platform type running a workload type is measured at step 401. Step 402 evaluates if power consumption is above a resilience threshold. When the power consumption is below a resilience threshold, program flow moves to step 403. Error rates of a platform correlated to workload types running on the platform are monitored at step 403 typically by software evaluating error rate data collected over a period of time. Step 404 evaluates whether any particular error rate is above a resilience threshold. When error rates are below or equal to a resilience threshold, program flow moves to step 405 where temperature of a platform type is measured. Step 406 evaluates whether the temperature of a resource is above a resilience threshold. When the temperature of the resource is below or equal to a resilience threshold, program flow moves to step 407 where the fan speed on a platform type running a workload type is monitored. Step 408 evaluates whether a fan speed is above a resiliency threshold. When fan speeds are below or equal to a resilience threshold, program flow proceeds back to box 401 and the sequence starts again. The workload running on a resource is reduced at step 409 when power consumption, error rate, temperature, or fan speed on a particular resource exceeds or approaches a threshold. Program flow moves from decision steps 402, 404, 406, or 408 to box 409 where the policy rules is adjusted. Power consumption, error rate, temperature, or fan speed on a particular resource threshold is above a resilience threshold. Program flow then moves from step 409 to step 401 where the sequence is repeated.

Embodiments of the invention may also monitor the power performance ratio of resources in the data center. The power performance ratio is a measure of the efficiency of the particular resource to perform a workload. If, for example, the power consumption of DRAM increases geometrically and operating frequency increases literally, the power performance ratio at different operating frequencies will be significantly different. Thus trends in the power performance ratio of a given resource may itself be an indication that workload should be reduced on a resource before it fails.

Figure 5:
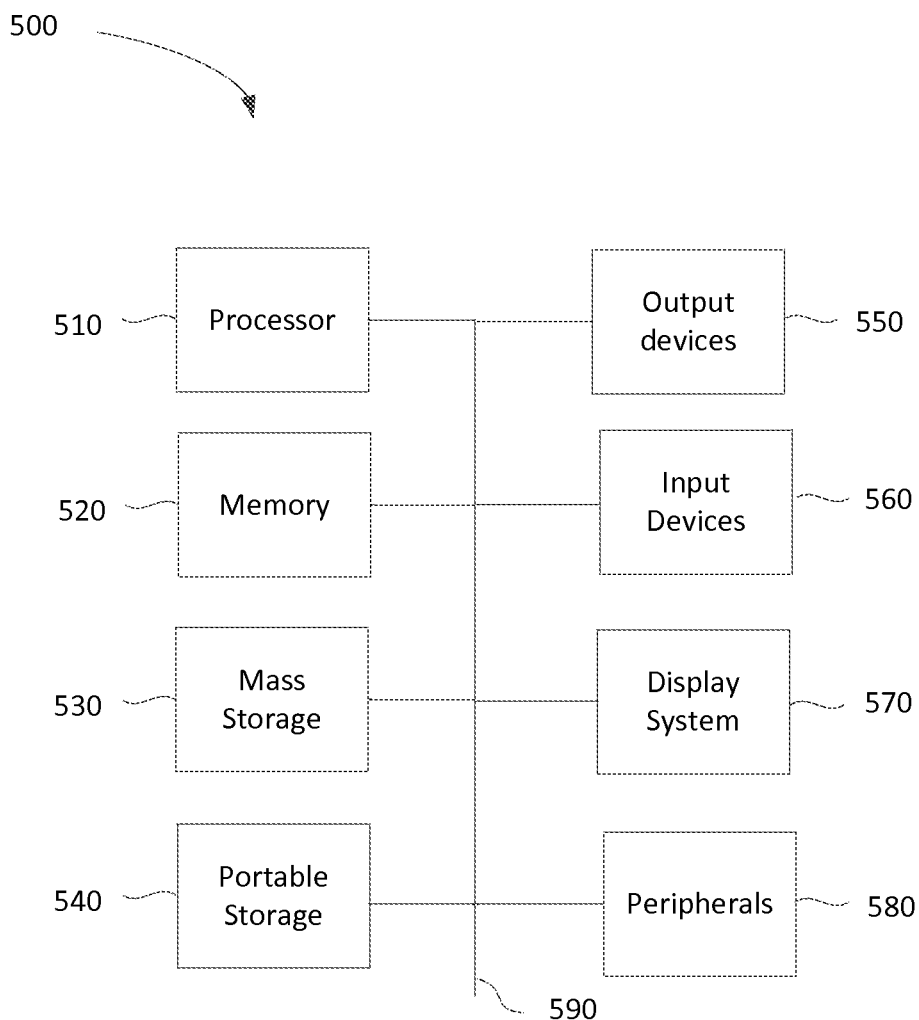
FIG. 5 illustrates an exemplary computing system for use with the present technology.

FIG. 5 illustrates an exemplary computing system 500 that may be used to implement a computing device for use with the present technology. In some embodiments, the computing system 500 may be used to implement management computer 4 and one or more machines of data center 1. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A method for dynamically distributing workloads across a plurality of computers in a data center, the method comprising:

identifying one or more policy rules, wherein the one or more policy rules correspond to one or more parametrics in the data center, the one or more parametrics including an identification of a resource platform type and a power performance ratio of a resource in the data center;

selecting one or more workload profiles from a set of established workload profiles;

monitoring power consumption of the resource and a measure of a workload performed by the resource, wherein the workload corresponds to a workload type and the workload type corresponds to operations associated with the platform type;

identifying a current measure of the power performance ratio;

identifying that power consumed by the resource has increased geometrically when the operating frequency of the resource has not increased geometrically according to the current measure of the power performance ratio; and adjusting the workloads in the data center based on the one or more policy rules and the one or more workload profiles of the set of established workload profiles, wherein at least one of the one or more parametrics corresponds to one or more data center power consumption levels, and at least one of the one or more policy rules correspond to one or more data center power consumption thresholds.

2. The method of claim 1, wherein the one or more policy rules correspond to at least one of the one or more selected workload profiles.

3. The method of claim 1, wherein total data center workload is decreased when the total data center power consumption is above a maximum power consumption threshold.

4. The method of claim 1, wherein the at least one of the one or more parametrics corresponding to the data center power consumption levels includes the power consumption of one or more individual computing resources in the data center.

5. The method of claim 4, wherein the workload running on a particular resource is reduced when the power consumption of that particular resource is above or approaches a maximum power consumption threshold for that particular resource.

6. The method of claim 1, wherein at least one of the one or more parametrics corresponds to one or more data center resiliency levels.

7. The method of claim 6, wherein at least one of the one or more policy rules correspond to one or more data center resiliency thresholds.

8. The method of claim 7, wherein at least one of the one or more parametrics corresponding to the data center resiliency levels includes error rate, temperature, fan speed, or latency.

9. The method of claim 8, wherein the workload running on a particular resource is reduced when the resiliency of that particular resource is above a maximum resiliency threshold for that particular resource.

10. The method of claim 1, wherein the at least one of the one or more parametrics corresponds to one or more data center performance levels.

11. The method of claim 10, wherein the at least one of the one or more policy rules corresponds to one or more data center performance thresholds.

12. The method of claim 11, further comprising: identifying an error rate associated with the resource; and
identifying, that a corrective action should be performed based on the identified error rate, wherein:
the corrective action includes at least one of:
reducing a number of operations per unit time that are allocated to the resource,
migrating at least a portion of the operations allocated to the resource to another resource, and
adjusting a fan speed at the resource, and the corrective action is performed.

13. The method of claim 11, wherein the workload performed by the resource is increased when the power performance ratio is below a minimum power performance threshold, and the workload performed by the resource is decreased when the power performance ratio is above the maximum power performance threshold.

14. A non-transitory computer readable storage medium having embodied thereon a program executable by a processor to perform a method, the method comprising:
identifying one or more policy rules, wherein the one or more policy rules correspond to one or more parametrics in the data center, the one or more parametrics including an identification of a resource platform type and a power performance ratio of a resource in the data center;
selecting one or more workload profiles from a set of established workload profiles;
monitoring power consumption of the resource and a measure of a workload performed by the resource, wherein the workload corresponds to a workload type and the workload type corresponds to operations associated with the platform type;
identifying a current measure of the power performance ratio; identifying that power consumed by the resource has increased geometrically when the operating frequency of the resource has not increased geometrically according to the current measure of the power performance ratio; and
adjusting the workloads in the data center based on the one or more policy rules and the one or more workload profiles of the set of established workload profiles, wherein at least one of the one or more parametrics corresponds to one or more data center power consumption levels, and at least one of the one or more policy rules correspond to one or more data center power consumption thresholds.

15. The non-transitory computer readable storage medium method of claim 14, wherein the one or more policy rules correspond to at least one of the one or more selected workload profiles.

16. The non-transitory computer readable storage medium method of claim 14, wherein the at least one of the one or more parametrics corresponding to the data center power consumption levels includes the power consumption of one or more individual resources in the data center, and wherein the workload running on a particular resource is reduced when the power consumption of that particular resource is above or approaches a maximum power consumption threshold for that particular resource.

17. The non-transitory computer readable storage medium method of claim 14, wherein at least one of the one or more parametrics corresponds to one or more data center resiliency levels, and wherein at least one of the one or more policy rules correspond to one or more data center resiliency thresholds.

18. The non-transitory computer readable storage medium method of claim 17, wherein at least one of the one or more parametrics corresponding to the data center resiliency levels includes error rate, temperature, fan speed, or latency, and wherein the workload running on a particular resource is reduced when the resiliency of that particular resource is above or approaches a maximum resiliency threshold for that particular resource.

19. A system comprising:
a plurality of compute nodes, wherein a compute node of the plurality of compute nodes is associated with a platform type and the platform type is associated with a resource;
a memory in each of the compute nodes;
a processor in each of the computer nodes;
one or more policy rules stored in the memory, wherein the one or more policy rules correspond to one or more parametrics in a data center; and one or more modules stored in memory and executable by the processor to select workload profiles from a set of established workload profiles, the one or more modules monitoring the one or more parametrics in the data center and adjusting the workloads in the data center based on the one or more policy rules and the one or more workload profiles, wherein:

power consumption of the resource and a measure of a workload performed by the resource are monitored, the workload performed by the resource corresponds to a workload type, the workload type corresponds to operations associated with the platform type, and a current measure of power performance ratio is identified, at least one of the one or more parametrics corresponding to one or more data center power consumption levels, the processor identifies that power consumed by the resource has increased geometrically when the operating frequency of the resource has not increased geometrically according to the current measure of the power performance ratio, and at least one of the one or more policy rules corresponding to one or more data center power consumption thresholds.

20. The system of claim 19, wherein at least one of the one or more policy rules correspond to at least one of the one or more selected workload profiles.

* * * * *